United States Patent
Wu (10) Patent No.: US 10,019,615 B2
(45) Date of Patent: Jul. 10, 2018

(54) FINGERPRINT IDENTIFICATION APPARATUS AND MANUFACTURING METHOD THEREOF

(71) Applicant: Gingy Technology Inc., Hsinchu (TW)

(72) Inventor: Jen-Chieh Wu, Hsinchu (TW)

(73) Assignee: Gingy Technology Inc., Hsinchu (TW)

( * ) Notice: Subject to any disclaimer, the term of this patent is extended or adjusted under 35 U.S.C. 154(b) by 0 days.

(21) Appl. No.: 15/264,582

(22) Filed: Sep. 13, 2016

(65) Prior Publication Data

US 2018/0018494 A1    Jan. 18, 2018

Related U.S. Application Data

(60) Provisional application No. 62/363,329, filed on Jul. 17, 2016.

(30) Foreign Application Priority Data

Aug. 2, 2016    (TW) .............................. 105124391 A (51) Int. Cl.
*G06K 9/28* (2006.01)
*G06K 9/00* (2006.01)

(52) U.S. Cl.
CPC ......... *G06K 9/0004* (2013.01); *G06K 9/0008* (2013.01); *G06K 9/00046* (2013.01)

(58) Field of Classification Search
CPC .............................. G06K 9/00013–2009/0006
See application file for complete search history.

(56) References Cited

U.S. PATENT DOCUMENTS

| | | | | |
|---|---|---|---|---|
| 7,349,562 B2 * | 3/2008 | Ogura | ................. | G06K 9/0004 250/556 |
| 2001/0050765 A1 * | 12/2001 | Antonelli | ........... | G06K 9/00026 356/71 |
| 2003/0103686 A1 * | 6/2003 | Ogura | ................ | G06K 9/00013 382/321 |
| 2006/0250605 A1 * | 11/2006 | Chern | ................ | G06K 9/00046 356/71 |
| 2009/0169071 A1 * | 7/2009 | Bond | ................... | A61B 5/1172 382/124 |

* cited by examiner

*Primary Examiner* — Brian P Werner
(74) *Attorney, Agent, or Firm* — JCIPRNET (57) ABSTRACT

A fingerprint identification apparatus including an image capture device, at least one light emitting device and a light guide device is provided. The image capture device has a light reception surface. The at least one light emitting device is disposed beside the image capture device. The light guide device shields the at least one light emitting device and has an opening. The opening of the light guide device exposes the light reception surface of the image capture device. The opening of the light guide device is defined by a side wall of the light guide device. The side wall of the light guide device is tilted relative to the light reception surface of the image capture device. Moreover, a manufacturing method of the fingerprint identification apparatus is also provided.

18 Claims, 7 Drawing Sheets

FINGERPRINT IDENTIFICATION APPARATUS AND MANUFACTURING METHOD THEREOF

CROSS-REFERENCE TO RELATED APPLICATION

This application claims the priority benefits of U.S. provisional application Ser. No. 62/363,329, filed on Jul. 17, 2016, and Taiwan application serial no. 105124391, filed on Aug. 2, 2016. The entirety of each of the above-mentioned patent applications is hereby incorporated by reference herein and made a part of this specification.

BACKGROUND OF THE INVENTION

Field of the Invention

The invention relates to a photoelectric apparatus, and particularly relates to a fingerprint identification apparatus.

Description of Related Art

Fingerprint identification apparatuses can be divided into optical, capacitive, ultrasonic and thermal sensing type fingerprint identification apparatuses. Taking the optical fingerprint identification apparatus as an example, the conventional optical fingerprint identification apparatus includes an optical assembly and an image capturing device. The optical assembly is used for transmitting lights. The optical assembly is, for example, a lens, a prism, etc. The image capturing device is used for capturing an image of a fingerprint. The image capturing device is, for example, a charge-coupled device (CCD), a complementary metal oxide semiconductor (CMOS), etc.

A principle of the optical fingerprint identification is as follows. The fingerprint of a finger is composed of a plurality of irregular peaks and troughs. When the finger presses the fingerprint identification apparatus, the peaks contact the fingerprint identification apparatus, and the troughs do not contact the fingerprint identification apparatus. The peaks may directly reflect the lights to the image capturing device to form bright zones. Meanwhile, the lights irradiating the troughs are repeatedly reflected in the troughs, and are then transmitted to the image capturing device to form dark zones. In this way, the lights corresponding to the peaks and the troughs of the fingerprint form bright and dark interleaved stripe patterns on a light reception surface of the image capturing device, such that the image capturing device obtains a fingerprint image. By using an algorithm to analyse information corresponding to the fingerprint image, user's identity can be identified.

However, during a process of assembling the fingerprint identification apparatus, a relative position between the optical assembly and the image capturing device has to be accurately adjusted to guide the light to the finger, and reflect the light transmitted to the finger to the image capturing device. The conventional fingerprint identification apparatus is not only complicate and difficult in assembling; assembling cost thereof is also higher. Moreover, a light-emitting device of the conventional fingerprint identification apparatus is a point light source, and if the light emitted by the point light source is diffused without optical processing, it may cause uneven distribution of the light irradiating the finger, and accordingly cause blur of a fingerprint image, which results in difficulty in fingerprint identification.

SUMMARY OF THE INVENTION

The invention is directed to a fingerprint identification apparatus, which has a excellent performance.

The invention is directed to a manufacturing method of a fingerprint identification apparatus, by which the fingerprint identification apparatus is easily assembled.

The invention provides a fingerprint identification apparatus including an image capturing device, at least one light-emitting device and a light guide device. The image capturing device has a light reception surface. The at least one light-emitting device is disposed beside the image capturing device. The light guide device shields the at least one light-emitting device and has an opening. The opening of the light guide device exposes the light reception surface of the image capturing device. The opening of the light guide device is defined by a side wall of the light guide device. The side wall of the light guide device is tilted relative to the light reception surface of the image capturing device.

The invention provides a manufacturing method of a fingerprint identification apparatus, which includes following steps: providing a circuit board, and disposing an image capturing device and at least one light-emitting device on the circuit board to electrically connect the circuit board, where the image capturing device has a light reception surface; providing a light guide device, where the light guide device is disposed on the circuit board and shields the at least one light-emitting device, and the light guide device has an opening exposing the light reception surface of the image capturing device; and providing a reflecting device pressed on the light guide device and fixed relative to the circuit board.

In an useful exemplary embodiment of the invention, the fingerprint identification apparatus is adapted to be pressed by a finger, the at least one light-emitting device is adapted to emit a light, and at least a part of the light is refracted by the side wall of the light guide device for propagating to the finger.

In an useful exemplary embodiment of the invention, an included angle between the side wall of the light guide device and the light reception surface of the image capturing device is an obtuse angle.

In an useful exemplary embodiment of the invention, the light guide device has a top surface and a bottom surface opposite to each other. A portion of the bottom surface of the light guide device leans against the image capturing device. The side wall of the light guide device is connected between the top surface and the bottom surface.

In an useful exemplary embodiment of the invention, the fingerprint identification apparatus may further include a reflecting device. The reflecting device covers a portion of the light guide device, and shields the at least one light-emitting device, and at least exposes the side wall of the light guide device and the light reception surface of the image capturing device.

In an useful exemplary embodiment of the invention, the at least one light-emitting device is adapted to emit a light, and a part of the light is reflected by the reflecting device for propagating to the side wall of the light guide device.

In an useful exemplary embodiment of the invention, the fingerprint identification apparatus further includes a circuit board. The image capturing device and the at least one light-emitting device are disposed on the circuit board and electrically connected to the circuit board.

In an useful exemplary embodiment of the invention, the fingerprint identification apparatus further includes an adhesive, the adhesive wraps the at least one light-emitting device. The light guide device covers the adhesive.

In an useful exemplary embodiment of the invention, the fingerprint identification apparatus further includes a protection layer. The protection layer covers the light reception surface of the image capturing device.

In an useful exemplary embodiment of the invention, the fingerprint identification apparatus further includes a reflecting device covering a portion of the light guide device, shielding the at least one light-emitting device, and at least exposing the side wall of the light guide device and the light reception surface of the image capturing device. The protection layer has an edge portion extending to a non-active region outside the light reception surface. The light guide device and the reflecting device cover the edge portion of the protection layer together.

In an useful exemplary embodiment of the invention, the protection layer is a coating layer or a transparent pressing board.

In an useful exemplary embodiment of the invention, the manufacturing method of the fingerprint identification apparatus further includes: providing a protection layer to cover the light reception surface of the image capturing device.

In an useful exemplary embodiment of the invention, the protection layer has an edge portion extending to a non-active region outside the light reception surface. The light guide device and the reflecting device cover the edge portion of the protection layer together when the reflecting device is pressed on the light guide device.

According to the above description, in the fingerprint identification apparatus of the invention, the tilted side wall of the light guide device guides the light for propagating toward a center of the opening of the light guide device. In this way, the finger of the user is uniformly irradiated by sufficient light, such that the image capturing device may obtain clear fingerprint image to facilitate fingerprint identification.

Moreover, in the manufacturing method of the fingerprint identification apparatus of the invention, the light-emitting device is disposed on the circuit board and disposed beside the image capturing device, and the light guide device and the reflecting device are sequentially disposed and fixed on the circuit board to complete the fingerprint identification device. In this way, the assembling difficulty and assembling cost of the fingerprint identification apparatus are decreased.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
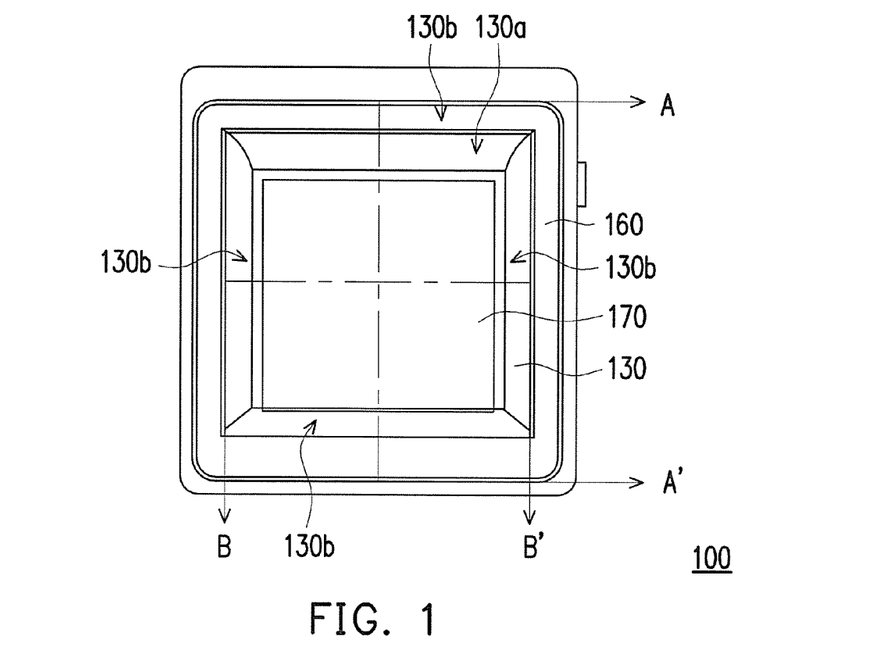
FIG. 1 is a top view of a fingerprint identification apparatus according to an embodiment of the invention.
Figure 2:
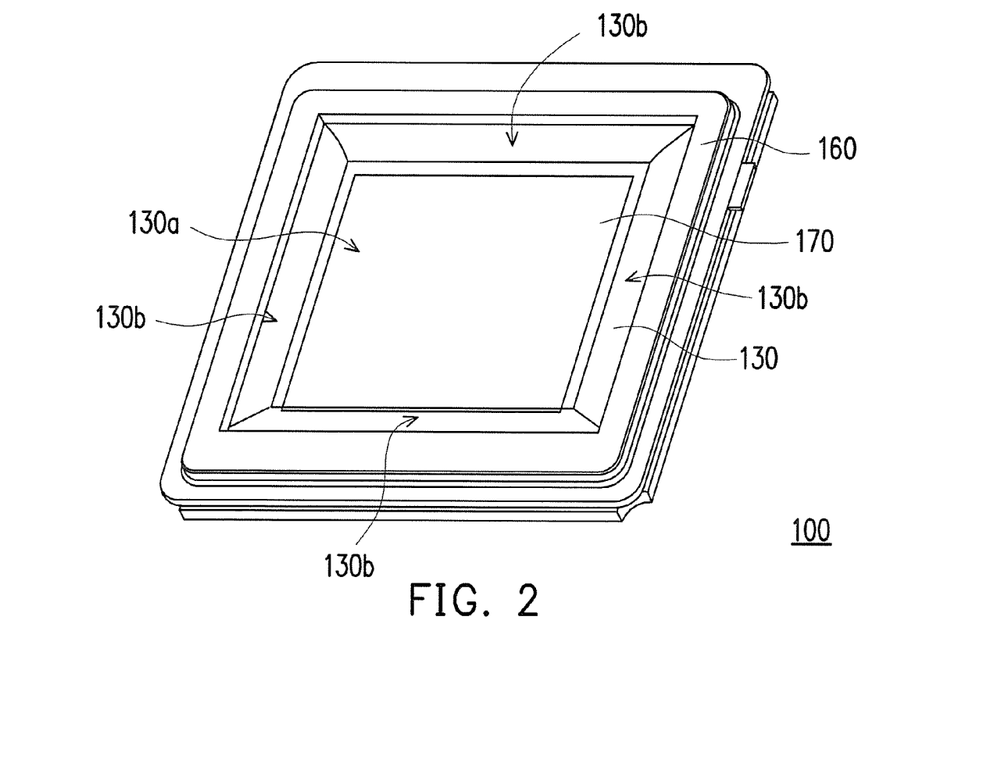
FIG. 2 is a three-dimensional view of the fingerprint identification apparatus of FIG. 1.
Figure 3:
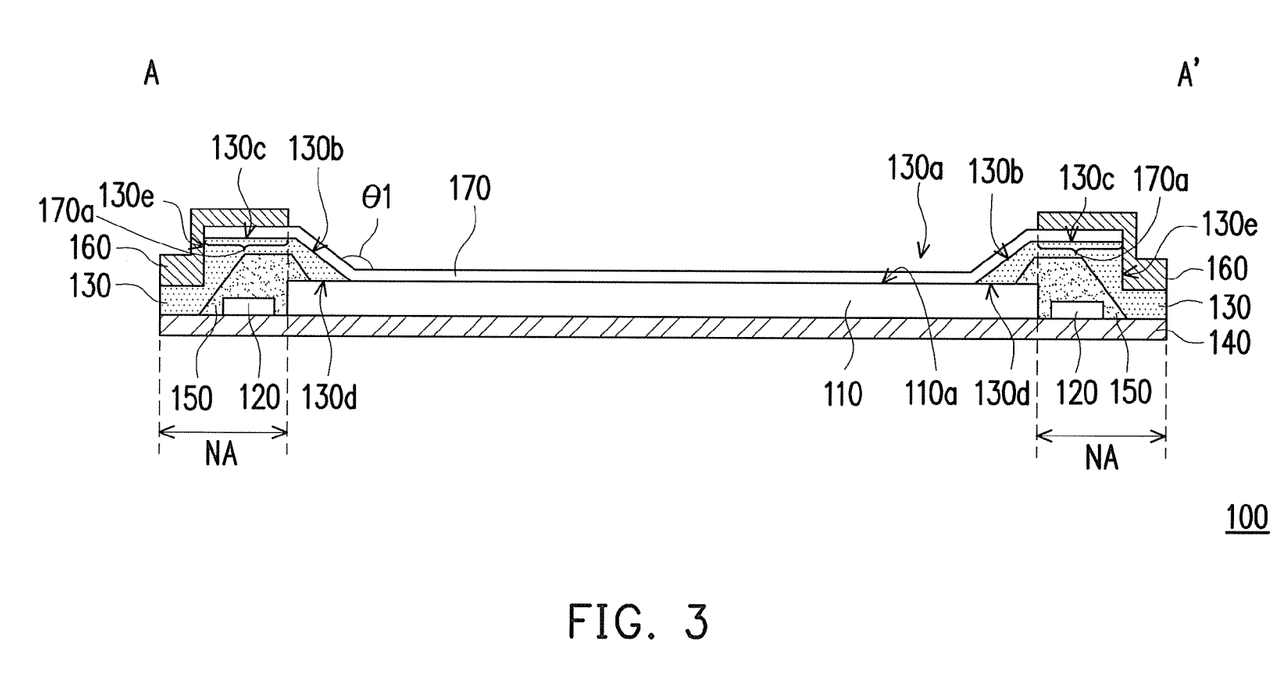
FIG. 3 is a cross-sectional view of the fingerprint identification apparatus of FIG. 1 viewing along a section line A-A'.
Figure 4:
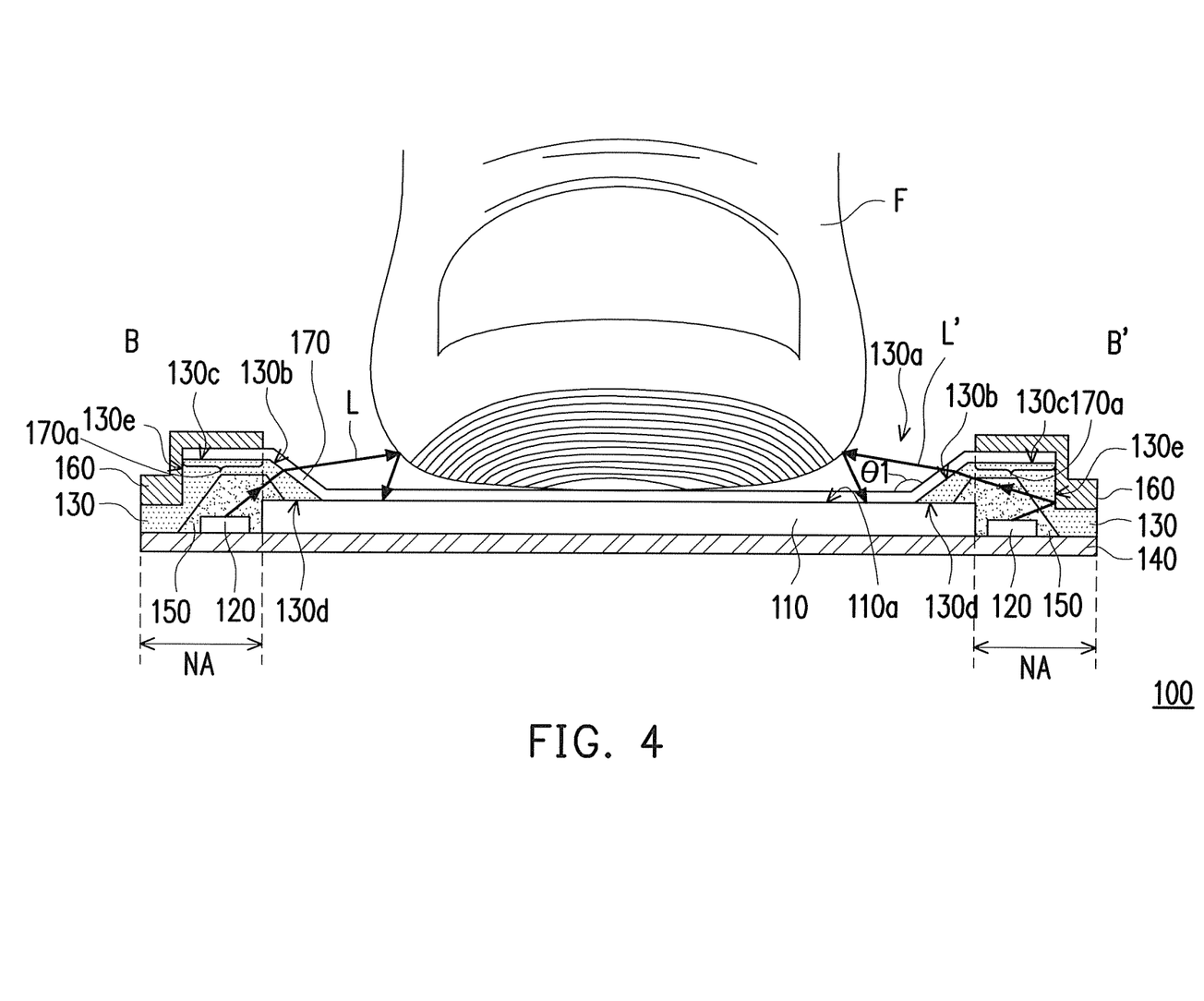
FIG. 4 is a cross-sectional view of the fingerprint identification apparatus of FIG. 1 viewing along a section line B-B'.

FIG. 1 is a top view of a fingerprint identification apparatus according to an exemplary embodiment of the invention. FIG. 2 is a three-dimensional view of the fingerprint identification apparatus of FIG. 1. FIG. 3 is a cross-sectional view of the fingerprint identification apparatus of FIG. 1 viewing along a section line A-A'. FIG. 4 is a cross-sectional view of the fingerprint identification apparatus of FIG. 1 viewing along a section line B-B'. Referring to FIG. 1, FIG. 2, FIG. 3 and FIG. 4, the fingerprint identification apparatus 100 includes an image capturing device 110, at least one light-emitting device 120 and a light guide device 130. The image capturing device 110 has a light reception surface 110a. When a finger F presses the fingerprint identification apparatus 100, the light reception surface 110a of the image capturing device 110 is overlapped with the fingerprint of the finger F. The at least one light-emitting device 120 is disposed beside the image capturing device 110. For example, in the present embodiment, two light-emitting devices 120 are respectively disposed at two opposite sides of the image capturing device 110. However, the invention is not limited thereto, and in other embodiment, the number and configuration positions of the light-emitting devices 120 can be properly designed according to an actual requirement.

In the present embodiment, the fingerprint identification apparatus 100 further includes a circuit board 140. The image capturing device 110 and the light-emitting devices 120 are disposed on the circuit board 140 and are electrically connected to the circuit board 140. In detail, in the present embodiment, the image capturing device 110 can be electrically connected to the circuit board 140 through a wire (not shown), and the light-emitting devices 120 can be electrically connected to the circuit board 140 through other wires (not shown). In other words, the image capturing device 110 and the light-emitting devices 120 can be electrically connected to the circuit board 140 through wire bonding. However, the invention is not limited thereto, and in other embodiments, the image capturing device 110 and the light-emitting devices 120 can be electrically connected to the circuit board 140 through other suitable manners.

In the present embodiment, the fingerprint identification apparatus 100 may selectively include an adhesive 150. The adhesive 150 is transparent and wraps the light-emitting devices 120 and a plurality of wires (not shown). The light guide device 130 covers the adhesive 150. Further, the light guide device 130 can be fixed on the circuit board 140 through the adhesive 150, though the invention is not limited thereto. The adhesive 150 may protect the light-emitting devices 120 and the aforementioned wires, so as to improve reliability of the fingerprint identification apparatus 100. However, the invention is not limited thereto, and in other embodiment, the fingerprint identification device 100 may not include the adhesive 150.

The light guide device 130 shields the light-emitting devices 120 and has an opening 130a. The opening 130a of the light guide device 130 exposes the light reception surface 110a of the image capturing device 110. The opening 130a of the light guide device 130 is defined by a side wall 130b of the light guide device 130. In detail, in the present embodiment, the light guide device 130 has a top surface 130c and a bottom surface 130d opposite to each other. The top surface 130c can be substantially parallel to the circuit board 140, and a portion of the bottom surface 130d may lean against the light reception surface 110a of the image capturing device 110. The side wall 130b of the light guide device 130 is connected between the top surface 130c and the bottom surface 130d. A boundary of the side wall 130b and the top surface 130c is an edge of the opening 130a. It should be noted that the side wall 130b of the light guide device 130 is tilted relative to the light reception surface 110a of the image capturing device 110. Further, the side wall 130b of the light guide device 130 is tilted from the top of the image capturing device 110 toward the top of the light-emitting device 120. An included angle between the side wall 130b of the light guide device 130 and the light reception surface 110a of the image capturing device 110 is an obtuse angle θ1 outside the material of the light guide device 130.

The light-emitting devices 120 are adapted to emit lights L, L'. In the present embodiment, the lights L, L' are, for example, invisible lights. However, the invention is not limited thereto, and in other embodiments, the lights L, L' can also be visible lights, or a combination of the visible light and invisible light. The lights L, L' emitted by the light-emitting devices 120 are incident to the light guide device 130 and are propagated in the light guide device 130. In this way, the light guide device 130 produces light to serve as a light source at periphery the light reception surface 110a. It should be noted that the side wall 130b of the light guide device 130 may refract the lights L, L' to propagate the lights L1, L' toward the finger F. In other words, besides that the light guide device 130 can disperse the lights L, L' to the periphery of the light reception surface 110a, the light guide device 130 may further guide the lights L, L' for propagating toward a center of the opening 130a. In this way, the finger F is uniformly irradiated by sufficient lights L, L', such that the image capturing device 110 may obtain a clear fingerprint image.

In the present embodiment, the fingerprint identification apparatus 100 may further include a reflecting device 160. The reflecting device 160 covers a portion of the light guide device 130, and shields the light-emitting device 120, and at least exposes the side wall 130b of the light guide device 130 and the light reception surface 110a of the image capturing device 110. For example, the reflecting device 160 can be a frame corresponding to the light guide device 130, and the reflecting device 160 is disposed on the light guide device 130, and covers the top surface 130c and a side wall 130e of the light guide device 130. The side wall 130e is located opposite to the side wall 130b, and is connected between the top surface 130c and the bottom surface 130d. The reflecting device 160 can be pressed on the light guide device 130, and the reflecting device 160 can be selectively fixed relative to the circuit board 140, so as to prevent the light guide device 130 from detaching the circuit board 140. It should be noted that besides the function of fixing the light guide device 130, the reflecting device 160 may further reflect the light L' that is not directly propagated to the tilted side wall 130 to the side wall 130b of the light guide device 130. In this way, more lights L' may irradiate the finger F, so as to improve the quality of the fingerprint image. In the present embodiment, a material of the reflecting device 160 is, for example, metal, though the invention is not limited thereto, and in other embodiment, the material of the reflecting device 160 may also adopt other proper light reflecting materials.

In the present embodiment, the fingerprint identification apparatus 100 may further include a protection layer 170. The protection layer 170 covers the light reception surface 110a of the image capturing device 110. In the present embodiment, the protection layer 170 is a coating layer. In other words, at least one type of coating can be formed on the light reception surface 110a of the image capturing device 110 in a coating manner, and the protection layer 170 is formed after the coating is hardened. The protection layer 170 has an abrasion resistance property, so as to prevent scratching of the light reception surface 110a of the image capturing device 110. The protection layer 170 has an edge portion 170a extending to a non-active region NA outside the light reception surface 110a. The light guide device 130 and the reflecting device 160 cover the edge portion 170a of the protection layer 170 together. The edge portion 170a of the protection layer 170 is sandwiched between the light guide device 130 and the reflecting device 160.

Figure 5:
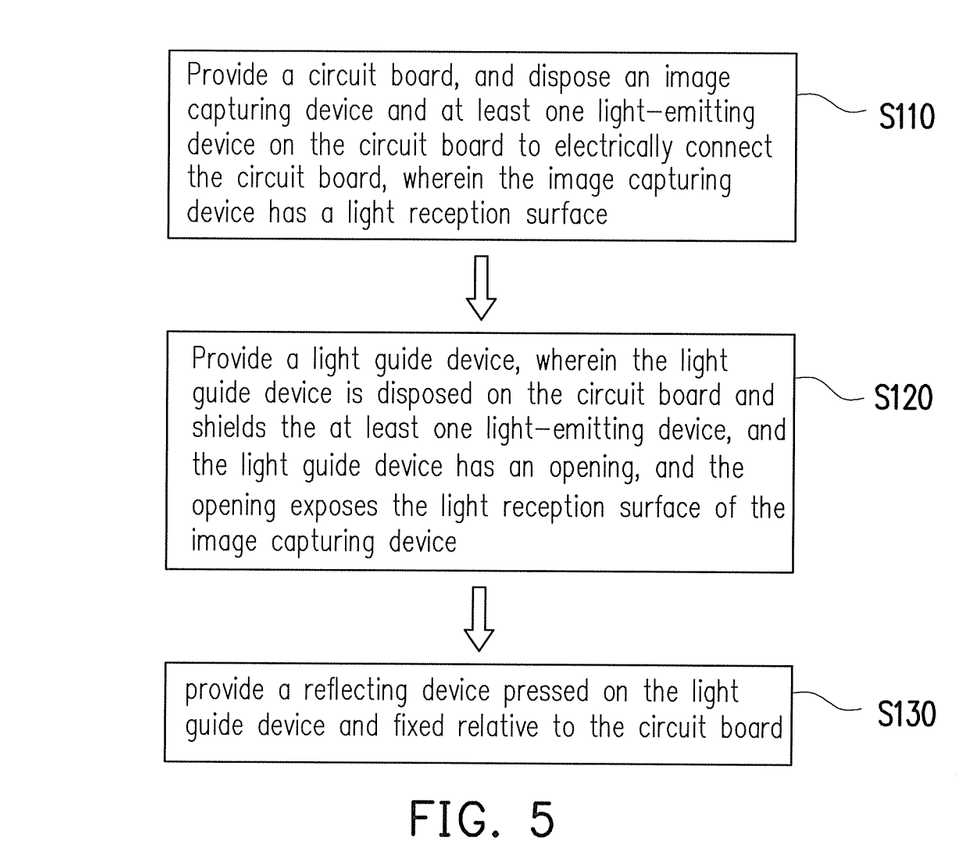
FIG. 5 is a flowchart illustrating a manufacturing method of a fingerprint identification apparatus according to an embodiment of the invention.

FIG. 5 is a flowchart illustrating a manufacturing method of a fingerprint identification apparatus according to an embodiment of the invention. Referring to FIG. 4 and FIG. 5, first, in step S110, the circuit board 140 is provided, and the image capturing device 110 having the light reception surface 110a and the at least one light-emitting device 120 are disposed on the circuit board 140, and the image capturing device 110 and the at least one light-emitting device 120 are electrically connected to the circuit board 140. For example, in the present embodiment, the image capturing device 110 can be electrically connected to the circuit board 140 through a wire (not shown), and the light-emitting device 120 can be electrically connected to the circuit board 140 through another wire (not shown). Then, the adhesive 140 is selectively used to wrap the light-emitting device 120 and the aforementioned wires.

Then, in step S120, the light guide device 130 is provided. The light guide device 130 is disposed on the circuit board 140 and shields the light-emitting device 120. The light guide device 130 has the opening 130a. The opening 130a exposes the light reception surface 110a of the image capturing device 110. Then, the protection layer 170 is provided to cover the light reception surface 110a of the image capturing device 110. Then, in step S130, the reflecting device 160 is provided. The reflecting device 160 is pressed on the light guide device 130 and is fixed relative to the circuit board 140. In the meanwhile, the light guide device 130 and the reflecting device 160 cover the edge portion 170a of the protection layer 170 together. In this way, manufacturing of the fingerprint identification apparatus 100 is completed. It should be noted that in the aforementioned manufacturing method of the fingerprint identification apparatus 100, the light-emitting devices 120 is disposed on the circuit board 140 and located beside the image capturing device 110, and then the light guide device 130 and the reflecting device 160 are sequentially disposed and fixed on the circuit board 140 to complete the fingerprint identification apparatus 100. In this way, the assembling difficulty and assembling cost of the fingerprint identification apparatus 100 are decreased.

Figure 6:
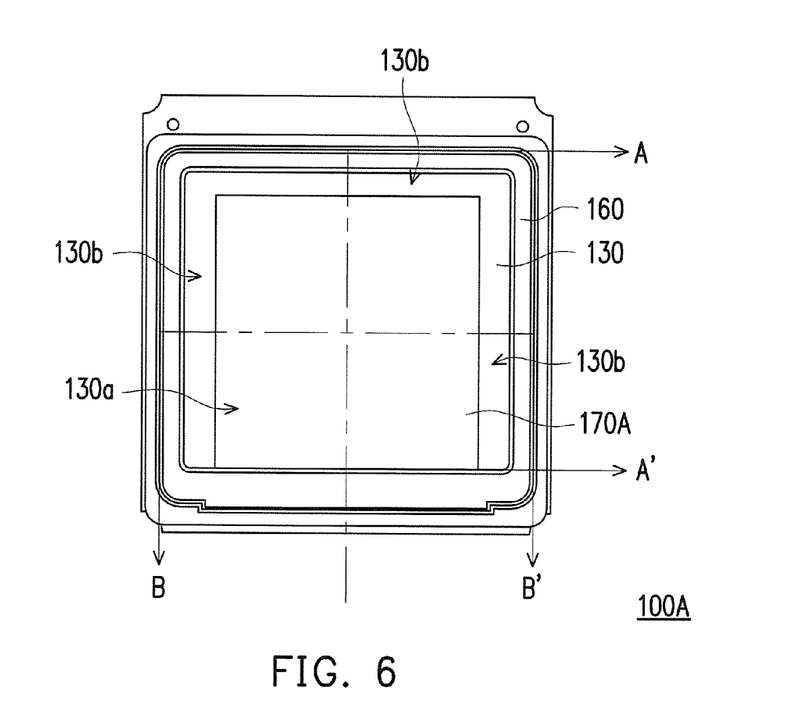
FIG. 6 is a top view of a fingerprint identification apparatus according to an embodiment of the invention.
Figure 7:
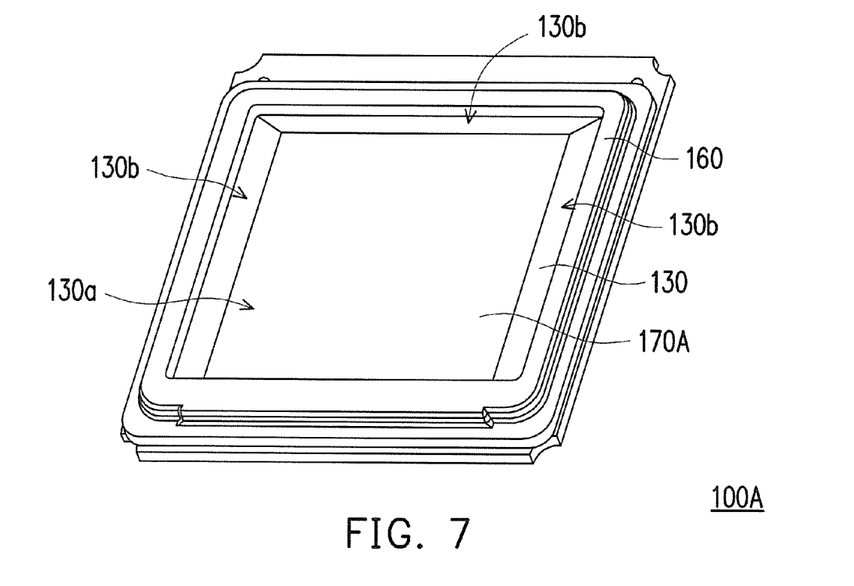
FIG. 7 is a three-dimensional view of the fingerprint identification apparatus of FIG. 6.
Figure 8:
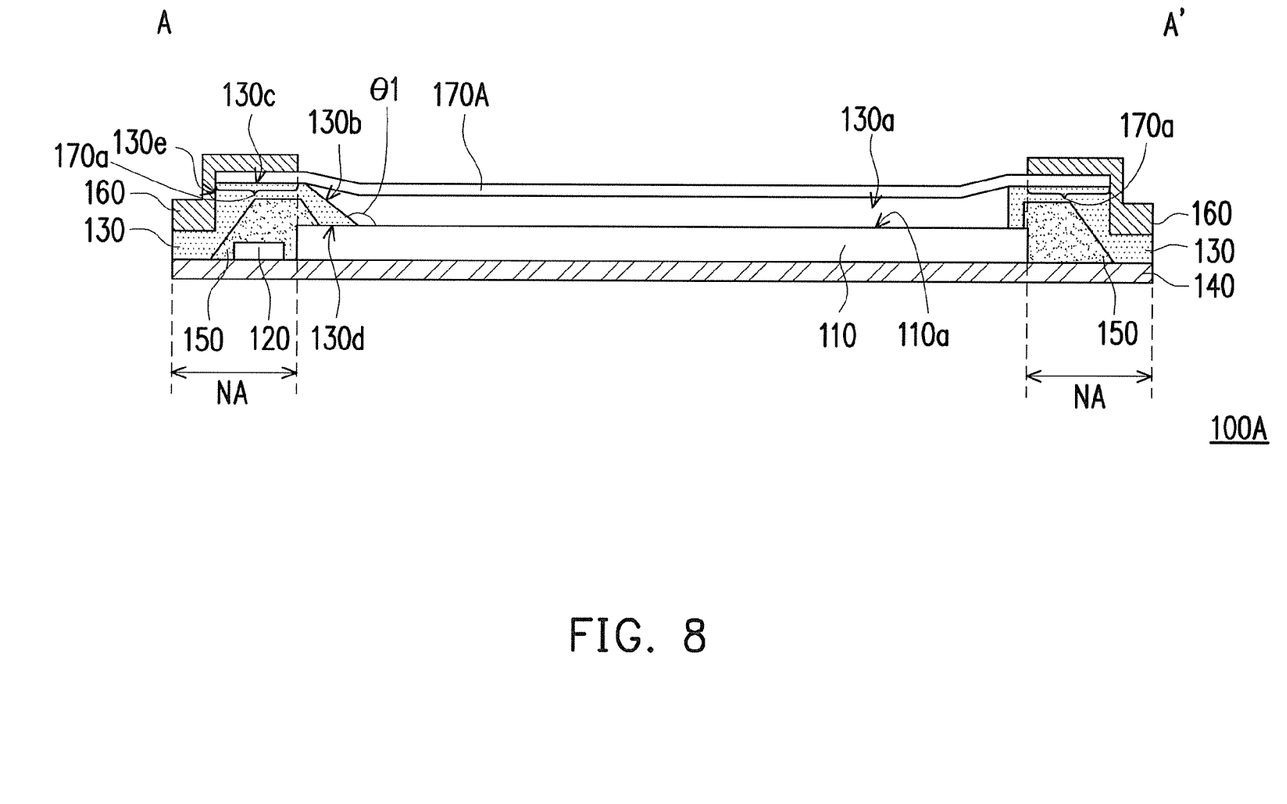
FIG. 8 is a cross-sectional view of the fingerprint identification apparatus of FIG. 6 viewing along a section line A-A'.
Figure 9:
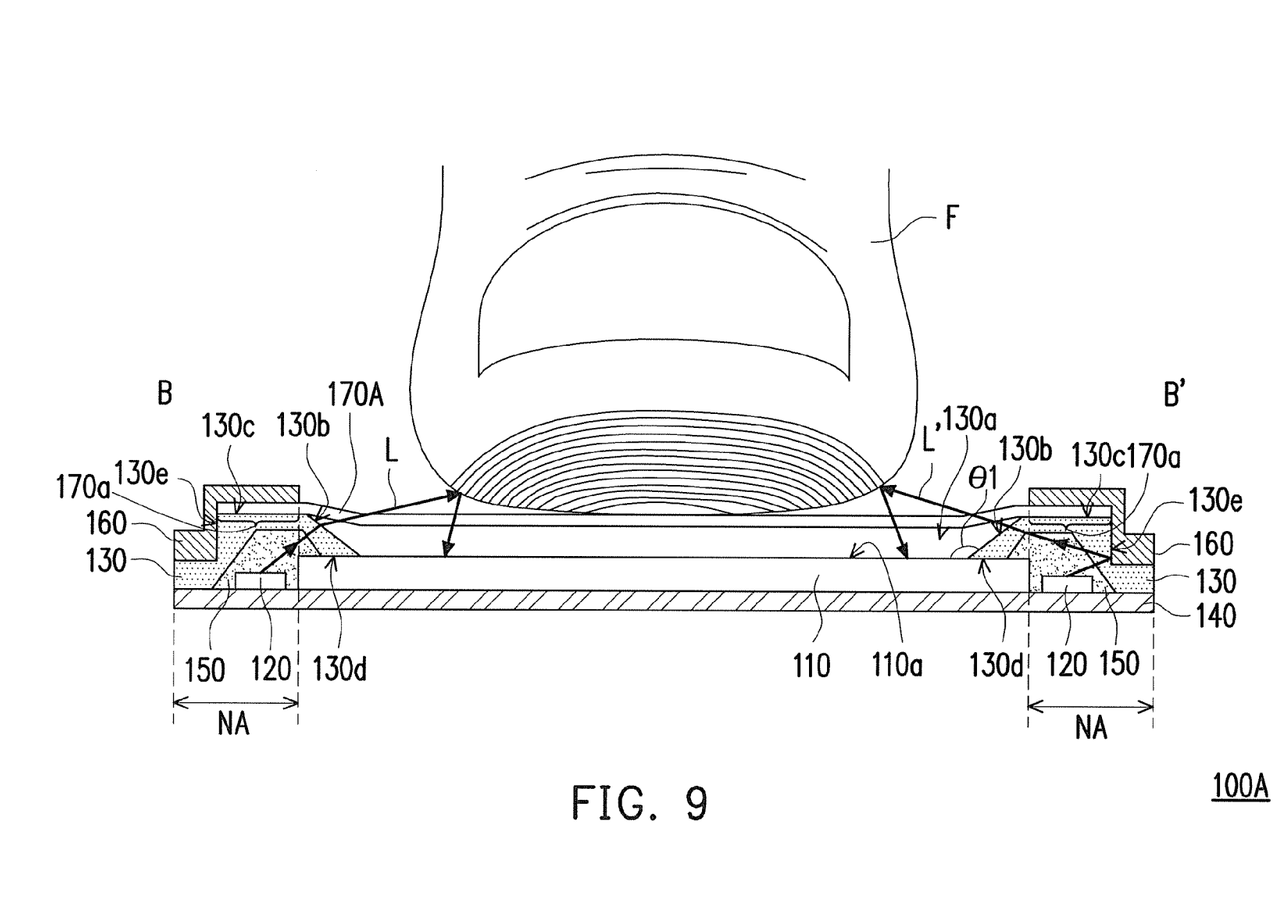
FIG. 9 is a cross-sectional view of the fingerprint identification apparatus of FIG. 6 viewing along a section line B-B'.

FIG. 6 is a top view of a fingerprint identification apparatus according to an embodiment of the invention. FIG. 7 is a three-dimensional view of the fingerprint identification apparatus of FIG. 6. FIG. 8 is a cross-sectional view of the fingerprint identification apparatus of FIG. 6 viewing along a section line A-A'. FIG. 9 is a cross-sectional view of the fingerprint identification apparatus of FIG. 6 viewing along a section line B-B'. Referring to FIG. 6, FIG. 7, FIG. 8 and FIG. 9, the fingerprint identification apparatus 100A is similar to the aforementioned fingerprint identification apparatus 100, so that the same or similar components are denoted by the same or similar referential numbers. A main difference between the fingerprint identification apparatus 100A and the aforementioned fingerprint identification apparatus 100 is that the protection layer 170A of the fingerprint identification apparatus 100A is different to the protection layer 170 of the fingerprint identification apparatus 100. The above difference is described in detail below, and the same parts of the two fingerprint identification apparatuses may refer to the description of the aforementioned embodiment, and details thereof are not repeated.

Referring to FIG. 6, FIG. 7, FIG. 8 and FIG. 9, the fingerprint identification apparatus 100A includes the image capturing device 110 having the light reception surface 110a, the at least one light-emitting device 120 and the light guide device 130. The at least one light-emitting device 120 is disposed beside the image capturing device 110. The light guide device 130 shields the light-emitting devices 120 and has the opening 130a. The opening 130a of the light guide device 130 exposes the light reception surface 110a of the image capturing device 110. The opening 130a of the light guide device 130 is defined by the side wall 130b of the light guide device 130, and the side wall 130b of the light guide device 130 is tilted relative to the light reception surface 110a of the image capturing device 110.

Different to the fingerprint identification apparatus 100, in the present embodiment, the protection layer 170A is a transparent pressing plate. The transparent pressing plate covers the light reception surface 110a of the image capturing device 110 to prevent scratching of the light reception surface 110a of the image capturing device 110. When the finger F presses the fingerprint identification apparatus 100A, the finger F may contact the transparent pressing plate (i.e. the protection layer 170A), and the light L may penetrate through the protection layer 170A to reach the finger F, and the image capturing device 110 obtains the fingerprint image.

Referring to FIG. 5, the fingerprint identification apparatus 100A can also be manufactured according to the manufacturing method of the fingerprint identification apparatus of FIG. 5. Referring to FIG. 5 and FIG. 9, first, in step S110, the circuit board 140 is provided, and the image capturing device 110 and the at least one light-emitting device 120 are disposed on the circuit board 140, and the image capturing device 110 and the at least one light-emitting device 120 are electrically connected to the circuit board 140. Then, in step S120, the light guide device 130 is provided. The light guide device 130 is disposed on the circuit board 140 and shields the light-emitting device 120. The light guide device 130 has the opening 130a. The opening 130a exposes the light reception surface 110a of the image capturing device 110. Then, the protection layer 170A is selectively provided to cover the light reception surface 110a of the image capturing device 110. In detail, the protection layer 170A (i.e. the transparent pressing plate) can be disposed on the light guide device 130, and the protection layer 170A, the light reception surface 110a and the side wall 130b of the light guide device 130 encircle a space. Then, in step S130, the reflecting device 160 is provided. The reflecting device 160 is pressed on the light guide device 130 and is fixed relative to the circuit board 140. In this way, manufacturing of the fingerprint identification apparatus 100A is completed. The manufacturing method of the fingerprint identification apparatus 100A has similar effects and advantages with that of the fingerprint identification apparatus 100, and detail thereof is not repeated.

In summary, the fingerprint identification apparatus of an embodiment of the invention includes the image capturing device having the light reception surface, the at least one light-emitting device and the light guide device. The at least one light-emitting device is disposed beside the image capturing device. The light guide device shields the light-emitting device and has an opening. The opening of the light-guide device exposes the light reception surface of the image capturing device. The opening of the light guide device is defined by a side wall of the light guide device. Particularly, the side wall of the light guide device is tilted relative to the light reception surface of the image capturing device. Besides that the light guide device can disperse the lights emitted by the light-emitting devices to the periphery of the light reception surface, the tilted side wall may guide the lights for propagating toward the center of the opening of the light guide device. In this way, the finger of the user is uniformly irradiated by sufficient lights, such that the image capturing device may obtain a clear fingerprint image.

Moreover, in the manufacturing method of the fingerprint identification apparatus of the invention, the light-emitting device is disposed on the circuit board and disposed beside the image capturing device, and the light guide device and the reflecting device are sequentially disposed and fixed on the circuit board to complete the fingerprint identification device. In this way, the assembling difficulty and assembling cost of the fingerprint identification apparatus are decreased.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A fingerprint identification apparatus, comprising:
   an image capturing device, having a light reception surface;
   at least one light-emitting device, disposed beside the image capturing device;
   an adhesive, wrapping the at least one light-emitting device;
   a light guide device, shielding the at least one light-emitting device and having an opening, wherein the opening of the light guide device exposes the light reception surface of the image capturing device, the opening of the light guide device is defined by a side wall of the light guide device, and the side wall of the light guide device is tilted relative to the light reception surface of the image capturing device;
   a reflecting device, disposed above the at least one light-emitting device, wherein the light guide device is located between the reflecting device and the adhesive, and the reflecting device covers a portion of the light guide device, shields the at least one light-emitting device, and at least exposes the side wall of the light guide device and the light reception surface of the image capturing device; and a protection layer, covering the light reception surface of the image capturing device and having an edge portion extending to a non-active region outside the light reception surface, wherein the light guide device and the reflecting device cover the edge portion of the protection layer together.

2. The fingerprint identification apparatus as claimed in claim 1, wherein the fingerprint identification apparatus is adapted to be pressed by a finger, the at least one light-emitting device is adapted to emit a light, and at least a part of the light is refracted by the side wall of the light guide device for propagating to the finger.

3. The fingerprint identification apparatus as claimed in claim 1, wherein an included angle between the side wall of the light guide device and the light reception surface of the image capturing device is an obtuse angle.

4. The fingerprint identification apparatus as claimed in claim 1, wherein the light guide device has a top surface and a bottom surface opposite to each other, a portion of the bottom surface of the light guide device leans against the image capturing device, and the side wall of the light guide device is connected between the top surface and the bottom surface.

5. The fingerprint identification apparatus as claimed in claim 1, wherein the at least one light-emitting device is adapted to emit a light, and a part of the light is reflected by the reflecting device for propagating to the side wall of the light guide device.

6. The fingerprint identification apparatus as claimed in claim 1, further comprising:
a circuit board, wherein the image capturing device and the at least one light-emitting device are disposed on the circuit board and electrically connected to the circuit board.

7. The fingerprint identification apparatus as claimed in claim 1, wherein the light guide device directly covers the adhesive.

8. The fingerprint identification apparatus as claimed in claim 1, wherein the protection layer is a coating layer or a transparent pressing board.

9. A manufacturing method of a fingerprint identification apparatus, comprising:
providing a circuit board, and disposing an image capturing device and at least one light-emitting device on the circuit board to electrically connect the circuit board, wherein the image capturing device has a light reception surface;
providing an adhesive, wherein the adhesive is used to wrap the at least one light-emitting device;
providing a light guide device, wherein the light guide device is disposed on the circuit board and shields the at least one light-emitting device, and the light guide device has an opening exposing the light reception surface of the image capturing device;
providing a reflecting device pressed on the light guide device and fixed relative to the circuit board, wherein the light guide device is located between the reflecting device and the adhesive; and
providing a protection layer to cover the light reception surface of the image capturing device, wherein the protection layer has an edge portion extending to a non-active region outside the light reception surface, and the light guide device and the reflecting device cover the edge portion of the protection layer together when the reflecting device is pressed on the light guide device.

10. The manufacturing method of the fingerprint identification apparatus as claimed in claim 9, wherein the protection layer is a coating layer or a transparent pressing board.

11. The manufacturing method of the fingerprint identification apparatus as claimed in claim 9, wherein the opening of the light guide device is defined by a side wall of the light guide device, and the side wall of the light guide device is tilted relative to the light reception surface of the image capturing device.

12. A fingerprint identification apparatus, comprising:
an image capturing device, having a light reception surface;
at least one light-emitting device, disposed beside the image capturing device;
a light guide device, shielding the at least one light-emitting device and having an opening, wherein the opening of the light guide device exposes the light reception surface of the image capturing device, the opening of the light guide device is defined by a first side wall of the light guide device, the first side wall of the light guide device is tilted relative to the light reception surface of the image capturing device, and the light guide device has a second side wall opposite to the first side wall and a top surface connected between the first side wall and the second side wall; and
a reflecting device, having a first reflective surface and a second reflective surface, wherein the first reflective surface covers the top surface of the light guide device, the second reflective surface covers the second side surface of the light guide device and is disposed perpendicularly to the first reflective surface, and a part of a light emitted by the at least one light-emitting device is reflected by the second reflective surface toward the first side wall of the light guide device.

13. The fingerprint identification apparatus as claimed in claim 12, wherein the fingerprint identification apparatus is adapted to be pressed by a finger, the at least one light-emitting device is adapted to emit a light, and at least a part of the light is refracted by the side wall of the light guide device for propagating to the finger.

14. The fingerprint identification apparatus as claimed in claim 12, wherein an included angle between the side wall of the light guide device and the light reception surface of the image capturing device is an obtuse angle.

15. The fingerprint identification apparatus as claimed in claim 12, wherein the light guide device has a top surface and a bottom surface opposite to each other, a portion of the bottom surface of the light guide device leans against the image capturing device, and the side wall of the light guide device is connected between the top surface and the bottom surface.

16. The fingerprint identification apparatus as claimed in claim 12, further comprising:
an adhesive, wrapping the at least one light-emitting device, and the light guide device covering the adhesive wherein the light guide device directly covers the adhesive.

17. The fingerprint identification apparatus as claimed in claim 12, further comprising:
a protection layer, covering the light reception surface of the image capturing device.

18. The fingerprint identification apparatus as claimed in claim 17, wherein the reflecting device covers a portion of the light guide device, shields the at least one light-emitting device, and at least exposes the side wall of the light guide device and the light reception surface of the image capturing device, the protection layer has an edge portion extending to a non-active region outside the light reception surface, and the light guide device and the reflecting device cover the edge portion of the protection layer together.

* * * * *